Jan. 27, 1948.  G. L. BUC ET AL  2,435,176
FLICKERING BEAM SPECTROPHOTOMETERS FOR THE MEASUREMENT OF BRONZE
Filed Aug. 8, 1946
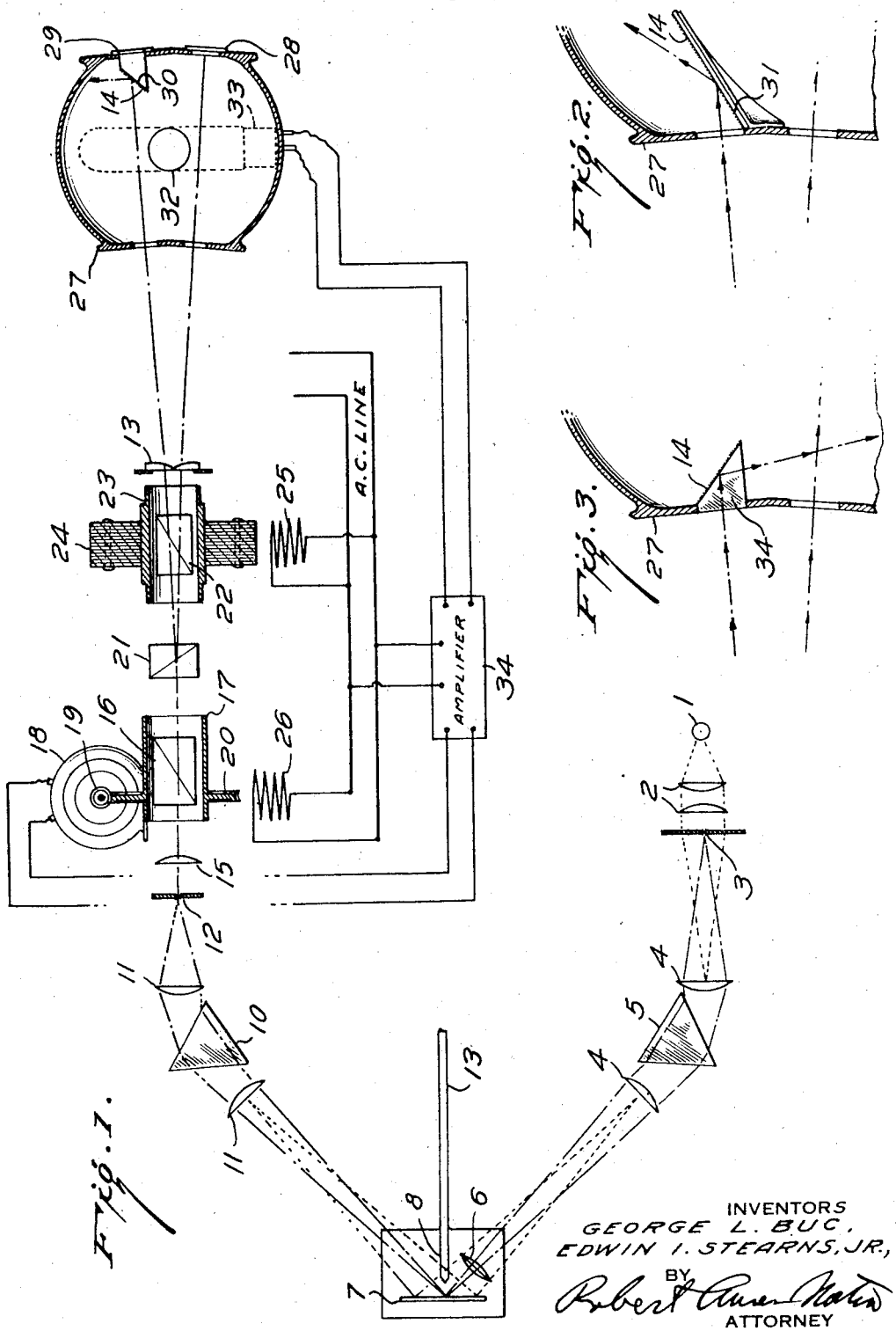
INVENTORS
GEORGE L. BUC,
EDWIN I. STEARNS, JR.,
BY
ATTORNEY Patented Jan. 27, 1948

2,435,176

UNITED STATES PATENT OFFICE 2,435,176

FLICKERING BEAM SPECTROPHOTOMETER FOR THE MEASUREMENT OF BRONZE

George L. Buc, Orange, and Edwin I. Stearns, Jr., North Plainfield, N. J., assignors to American Cyanamid Company, New York, N. Y., a corporation of Maine Application August 8, 1946, Serial No. 689,145

6 Claims. (Cl. 250—41.5)

This invention relates to flickering beam spectrophotometers capable of measuring bronze and to attachments therefor.

Flickering beam spectrophotometers, particularly those using polarization photometering, have achieved extended use because of their speed and accuracy. However, these instruments, when used for reflection measurements, are only capable of measuring total reflectance both of the body color of a colored object and the surface. The phenomenon of bronze in pigments, inks, and the like, is one of chromatic surface reflectance at various angles. Such measurements cannot be made in the ordinary flickering beam spectrophotometer and this field of measurement, therefore, has been closed to flickering beam spectrophotometers and has necessitated the use of less efficient measurements. The pigment and ink manufacturer, however, is much concerned with bronze of various pigments, such as for example, alkali blue, because inks and surfaces colored therewith are often viewed at an angle at which the surface reflection is an important factor.

The bronze effect may be divided into two general types, interface and interference bronzes. Interference bronze occurs normally at an air-ink or pigment surface. Bronzing in such a case will usually vary widely in color with the angle of observation. The interface type of bronze can also be noted where an ink is mounted on a transparent surface such as glass and the ink-glass interface is observed for surface reflection. In this case there is often but little change in color with the angle of observation.

In our copending application Serial No. 689,144, filed August 8, 1946, now U. S. Patent 2,435,175, issued January 27, 1948, we have described various attachments for modifications of a flickering beam spectrophotometer, which attachments can be inserted in the sample beam and which reflect the specularly reflected light giving the bronze effect, re-directing it into the integrating device. These instruments give perfect results with all types of bronzes in pigments both light and dark in shade. They are, however, somewhat more complicated and delicate and require mountings which assure very accurate alignment. Many pigments are dark in shade or have a masstone which absorbs very strongly in the spectral regions where the color of the bronze is most pronounced. Examples of such pigments are alkali blue, which absorbs very strongly in the green and yellow range where the bronze is most pronounced. In the cast of such pigments a much simpler modification of or attachment for a flickering beam spectophotometer will give satisfactory bronze measurements, and it is with these simplified instruments that the present invention deals.

In the ordinary flickering beam spectrophotometer used for reflectance measurements the two flickering beams enter windows of an integrating sphere and strike a sample and reference target. The reference is usually a standard white, for which a magnesium carbonate block smoked with magnesium oxide is customarily employed. The sample target is the sample, the reflectance of which is to be measured. According to the present invention there is introduced into the sample beam in the integrating sphere a surface at a definitely predetermined angle to the beam. The inclination must be at a fairly large angle in order to reflect a sufficient amount of light specularly so that bronze can be measured. For practical operations the angle of incidence should not be less than 15° and preferably is more than 20°. This surface is covered with the pigment or ink, the bronze of which is to be measured. At reasonably high angles of incidence the intensity of the bronze reflection is relatively high and as this coincides with a portion of the spectrum in which the masstone of the pigment caused by diffuse reflection shows a high degree of absorption, bronze measurements can be obtained with useful accuracy. The attachments are simpler and more rugged than those which are described in our copending application above referred to and which permit measurement of bronze in any pigment regardless of the relative color of the pigment masstone and the bronze.

The invention will be described in greater detail in conjunction with the drawings, in which:

Fig. 1 is a diagrammatic sectional view of a flickering beam spectrophotometer using one modification of the present invention;

Fig. 2 is a section of an integrating sphere embodying a modified type of reflectance sample mounting, and Fig. 3 is a section of an integrating sphere embodying a reflectance sample mounting for measuring ink-glass interface bronze.

In Fig. 1 the monochromator consists of an incandescent lamp 1, preferably of the low voltage compact filament type, a pair of condensing lenses 2, a variable slit 3, collimating lenses 4, first prism 5, lens 6, mirror 7, knife edge 8, second prism 10, collimating lenses 11 and exit slit 12. The mirror and knife edge may be recipro- cated by means of the rod 13 moving the slit defined by the knife edge through the spectrum so that the light passing slit 12 can be caused to traverse the visible spectrum.

The light leaving the slit 12 of the monochromator is focused by lens 15 onto the photometric prism 16 which is of a conventional Nicol or Rochon type. The prism is mounted in the hollow shaft 17 which is rotated by the motor 18 through the worm 19 and ring gear 20. The plane polarized beam leaves the photometric prism and passes through a Wollaston prism 21 where it is separated into two beams plane polarized at right angles to each other and the two beams pass through a flicker prism 22 which is mounted in a hollow shaft 23 being the center of the rotor 24 of a synchronous motor, the field 25 of which is energized by 60 cycle alternating current which is also used to energize the field 26 of the motor 18. After passing through the flicker prism and decentering lenses 13, one beam enters an integrating sphere 27, striking a target 28, which may be the usual magnesium carbonate block smoked with magnesium oxide. The other beam strikes a sample target 29 which is in the form of a wedge shaped block projecting into the integrating sphere and having a surface 30 inclined to the light path to produce the desired angle of incidence. The inclined surface is covered with an ink layer 14 or other dispersion of the pigment, the bronze of which is to be measured.

The light reflected from the sample is made up both of the specularly reflected light which causes the phenomenon of bronze and the diffusely reflected light which represents the masstone of the pigment. The integrating sphere treats these two reflections in the same way and integrates the total light from both flickering beams. When the reflected light is the same for both beams the total light does not change at flicker frequency, but if the reflection from one target is less than from the other the total light in the integrating sphere will pulsate at flicker frequency in phase with the more strongly reflected beam. The phototube 33 which receives integrated light through the opening 32 transforms these flicker frequency fluctuations into electrical current which enters the input of the high gain amplifier 34 and the spectrophotometer operates in the conventional manner, that is to say the flicker frequency output of the amplifier is led to the motor 18, the phase being so adjusted that the motor drives the photometering prism 16 in a direction to reduce the intensity of the stronger beam and increase the intensity of the other beam until a balance is achieved in the integrating sphere. The amount of movement of the prism 16 can be used to measure the ratio of intensity of reflection of the two beams.

Throughout the portion of the spectrum where bronze is particularly noted, by far the greater portion of light reflected from the sample is specularly reflected light, the diffusely reflected masstone of the sample showing so high an absorption that this portion of the spectrophotometric curve, which can be obtained from the machine, measures the bronze with a sufficient degree of accuracy for most practical operations.

Flickering beam spectrophotometers are ordinarly adjusted to give a 100% reading when a standard magnesium carbonate block is used for the sample as well as a standard. In such a case, however, the block is struck by the sample beam normally. It is, therefore, sometimes desirable to determine the 100% point with a mirror projecting into the integrating sphere and having a surface inclined to give the same angle of incidence as the pigment sample, the bronze of which is to be measured. The determination of an absolute 100% point in flickering beam spectrophotometers is a routine procedure for many operations, but in the case of the present invention the 100% point may be displaced to a greater degree than is normally the case and requires a somewhat larger correction in order to obtain absolute values.

Fig. 2 shows a portion of a standard integrating sphere as shown in Figure 1 provided with an inclined surface 31 inside the sphere immediately adjacent the window through which the sample beam enters the sphere. On this inclined surface there is placed the layer of ink 14 or other dispersion of pigment, the bronze of which is to be measured. The portion of the device is the same as in Fig. 1, but it will be noted that the placement adjacent to the window causes the reflected beam to strike the integrating sphere forward of its back wall. This permits measuring somewhat larger angles of incidence than is possible with the modification shown in Fig. 1, as there is no danger of the reflected beam striking too small an area of the integrating sphere for satisfactory integration of the light. On the other hand, the modification of Fig. 2 is not quite so simple in construction and cannot be interchanged with the ordinary target blocks of a sphere with the same speed and ease as is possible with the modification shown in Fig. 1.

Figure 3 illustrates an integrating sphere modified to measure bronze from an ink-glass surface. In the sphere there is mounted back of the window through which the sample beam enters the sphere, a reflecting prism 34, the reflecting surface of which is adapted to carry an ink coating 14. The specularly reflected light due to bronze passes through the prism and emerges as shown in the figure, striking a side of the integrating sphere and being integrated in the same manner as the specularly reflected light from air-ink surface shown in Figs. 1 and 2.

We claim:
1. In a flickering beam spectrophotometer comprising a monochromator, a photometering element, a beam splitter, means for causing the two beams to flicker in opposite phase, and an integrating sphere into which the two beams enter, photoelectric means capable of transforming flicker frequency fluctuations of integrated light into electric currents and constituting the input of a high gain vacuum tube amplifier, and electric driving means for the photometering element actuated by the amplified flicker frequency component of the amplifier, the improvement which comprises a target in the integrating sphere struck by one of the beams and comprising a surface inclined at least 15° to the normal of the beam and adapted to receive a coating, the bronze of which is to be measured.

2. A spectrophotometer according to claim 1 in which the integrating sphere is provided with two inlet windows for the beams and a target opposite one of the windows, said target being provided with a surface inclined at least 15° to the normal of the flickering beam striking it and being adapted to receive a coating, the bronze of which is to be measured.

3. A spectrophotometer according to claim 1 in which the integrating sphere is provided with beam entrance windows and beam targets, a surface inclined at least 15° to the normal of the beam being mounted inside the sphere adjacent one of the windows and being struck by the flickering beam entering said window at an angle, said surface being adapted to receive a coating, the bronze of which is to be measured.

4. In a flickering beam spectrophotometer comprising a monochromator, a photometering element, a beam splitter, means for causing the two beams to flicker in opposite phase, and an integrating sphere into which the two beams enter, photoelectric means capable of transforming flicker frequency fluctuations of integrated light into electric currents and constituting the input of a high gain vacuum tube amplifier, and electric driving means for the photometering element actuated by the amplified flicker frequency component of the amplifier, the improvement which comprises a target in the integrating sphere struck by one of the beams and comprising a surface inclined more than 20° to the normal of the beam and adapted to receive a coating, the bronze of which is to be measured.

5. A spectrophotometer according to claim 4 in which the integrating sphere is provided with two inlet windows for the beams and a target opposite one of the windows, said target being provided with a surface inclined more than 20° to the normal of the flickering beam striking it and being adapted to receive a coating, the bronze of which is to be measured.

6. A spectrophotometer according to claim 4 in which the integrating sphere is provided with beam entrance windows and beam targets, a surface inclined more than 20° to the normal of the beam being mounted inside the sphere adjacent one of the windows and being struck by the flickering beam entering said window at an angle, said surface being adapted to receive a coating, the bronze of which is to be measured.

GEORGE L. BUC.
EDWIN I. STEARNS, Jr.

REFERENCES CITED

The following references are of record in the file of this patent:

UNITED STATES PATENTS

| Number | Name | Date |
| --- | --- | --- |
| 1,987,441 | Hardy | Jan. 8, 1935 |
| 2,107,836 | Pineo | Feb. 8, 1938 |